United States Patent [19]
Kito et al.

[11] Patent Number: 5,548,586
[45] Date of Patent: Aug. 20, 1996

[54] MOBILE PACKET COMMUNICATION SYSTEM AND A METHOD OF MOBILE PACKET COMMUNICATION

[75] Inventors: Eiji Kito, Tokyo; Tetsuya Toyoda, Saitama, both of Japan

[73] Assignee: NEC Corporation, Tokyo, Japan

[21] Appl. No.: 514,742

[22] Filed: Aug. 14, 1995

[30] Foreign Application Priority Data

Aug. 12, 1994 [JP] Japan .................................. 6-190241

[51] Int. Cl.⁶ .............................. H04Q 7/22; H04L 12/56
[52] U.S. Cl. ............................................ 370/60; 370/94.1
[58] Field of Search ......................... 370/60, 60.1, 94.1, 370/94.2, 94.3, 95.1, 95.3, 92, 110.1; 379/59, 60, 63; 455/33.1, 33.2, 33.4, 54.1, 56.1

[56] References Cited

U.S. PATENT DOCUMENTS

| | | | |
|---|---|---|---|
| 4,955,050 | 9/1990 | Yamauchi | 379/59 |
| 5,260,987 | 11/1993 | Mauger | 379/59 |
| 5,305,466 | 4/1994 | Taketsugu | 455/33.1 |
| 5,315,637 | 5/1994 | Breeden et al. | 379/63 |
| 5,396,543 | 3/1995 | Beeson, Jr. et al. | 379/59 |
| 5,442,684 | 8/1995 | Hashimoto et al. | 379/59 |

FOREIGN PATENT DOCUMENTS 0479477  4/1992  European Pat. Off. .

3-40527  2/1991  Japan .

OTHER PUBLICATIONS

*Mobile Management Introduction*, "Cellular Digital Packet Data System Specification", Apr. 30, 1993, pp. 500–1 to 500–12.

*Primary Examiner*—Hassan Kizou
*Attorney, Agent, or Firm*—Young & Thompson

[57] ABSTRACT

A mobile packet communication system and a method of mobile packet communication, which are capable of transmitting packet data only to a specific base station area in which a mobile station for the packet communication exists without transmitting the packet data to all base stations in the same location area, are provided. Although a mobile switching center transmits a call setup information to all base stations at the beginning of the sequence, it can recognize the base station area of the mobile station by the BS area identifier which is attached by the base station to the response information. The BS area identifier is stored in the mobile switching center, and the packet data from the next sequence is transmitted only to the base station indicated in the BS area identifier. When the mobile station has moved to the other base station area during the packet communication, a BS area identifier update request signal is sent to the mobile switching center for updating the BS area identifier.

7 Claims, 9 Drawing Sheets

MOBILE PACKET COMMUNICATION SYSTEM AND A METHOD OF MOBILE PACKET COMMUNICATION

BACKGROUND OF THE INVENTION

1. Field of the Invention

The present invention relates to a mobile packet communication system and a method of mobile packet communication, and more particularly, to a mobile packet communication system and a method of mobile packet communication which are capable of transmitting a packet data to a specific base station area only in which a mobile station for a packet communication exists without broadcasting the packet data to all base station areas in a same location area.

2. Description of Related Art

A configuration of radio channels used in a mobile communication system is shown in FIG. 1. Radio channels are divided into two major categories, i.e. a traffic channel (TCH) which carries user traffic and a control channel (CCH) which is used to establish the TCH. The CCH is also divided into a broadcast control channel (BCCH), a common control channel (CCCH), a user packet channel (UPCH) and an associated control channel (ACCH). The BCCH, the CCCH and the UPCH are called the common access channels, as those channels are used by all mobile stations commonly, and the ACCH is called the user specific channel, as the ACCH is assigned to each TCH, i.e. the ACCH is associated with the TCH which is used by one mobile station for its call.

When a call is requested by a mobile station, a call request signal is transmitted to a mobile switching center through a base station by the CCCH, and a communication channel (TCH) allocated for the call is allocated to the mobile station from the mobile switching center by the CCCH. The CCCH is also used for broadcasting a paging signal to mobile stations when there is an incoming call to be received by a paged mobile station. The mobile station uses the allocated TCH for its communication to the other party. A channel switching signal or other signalling information necessary for controlling the call during communication is transmitted by the ACCH which is associated with the TCH. The BCCH is used for broadcasting a location code signal for location registration, number of control channels for allocating a control channel configuration. When communication information is transmitted by a packet form, the UPCH provided as the common channel is used, and the mobile communication system transmitting and receiving packet data signals by using the UPCH is called a mobile packet communication system.

An up-stream channel (signal direction from the mobile station to the base station: hereafter referred to as up-link) of the UPCH is used by a plurality of mobile stations on a random access basis and a down-stream channel (signal direction from the base station to the mobile station: hereafter referred to as down-link) of the UPCH is used as a basis for broadcasting. That is, a packet data signal on the down-link of the UPCH to a mobile station is broadcasted in all base stations in a location area, even if the mobile station to receive the packet data signal exists in one of base station areas.

The relation among the service area, the location area and the base station area of the mobile communication system will now be described.

The service area of a mobile communication system for mobile communication services consists of one or more location areas, each of which is identified by location information. A mobile station which is moving in the service area of the mobile communication can identify the location area, in which the mobile station exists at present, by receiving a location code signal broadcasted in each location area. When the mobile station has entered into a different location area, the mobile station recognizes the change of location area by receiving a different location code signal, and as the result, it requests a location registration to a location register through a nearest base station and a mobile switching center to update the location information of the mobile station stored in the location register.

The location information of the mobile station stored in the location register is retrieved and referred by the mobile switching center when the mobile switching center establishes a communication link to the mobile station for an incoming call. As the location area usually consists of a plurality of base station areas each of which is covered by the radio signal of a base station, the paging signal to page the mobile station for the incoming call is broadcasted from all base stations in the location area which has been identified by the location information in the location register.

FIG. 2 is a block diagram illustrating a conventional mobile packet communication system, and shows how a packet data is transmitted from a packet terminal (not shown in the drawing) in a fixed communication network 40 to the mobile station 11.

The location area 50 consists of a base station area A which is covered by radio signals of the base station 10 and a base station area B which is covered by radio signals of the base station 20. The base stations 10 and 20 are connected to the mobile switching center 30, and the mobile switching center 30 is connected to the fixed communication network 40. The mobile station 11 exists in the base station area A and the mobile station 21 exists in the base station area B. Signals from a call from the mobile station 11 are received by the base station 10 and are transferred to the mobile switching center 30 to establish a communication link either to the fixed network 40 or to the base station 20 depending on a routing information sent from the mobile station 11. In the case of incoming call, a call sent from the fixed network is received by the mobile switching center 30, and the mobile switching center 30 retrieves location information corresponding to the mobile station 11 to be called from the location register (not shown). Once the location area 50 in which the mobile station 11 to be called exists has been identified, the mobile switching center 30 instructs to broadcast paging signal to all base stations 10 and 20 in the location area 50.

If the call is a circuit call, such as voice communication other than the packet call, the communication link (the TCH) from a calling party to a called party (the mobile station 11) is established after the mobile station 11 has answered the paging signal, and after this, the signal for communication to the mobile station 11 are transmitted only from the base station 10 in the location area 50.

However, in the case of packet call, each packet data signal of packet communication is broadcasted from all base stations 10 and 20 in the same location area 50 even after the communication has commenced. This is because the communication link of the TCH dedicated to the call is not established for packet call, and only the UPCH provided for all mobile stations commonly is used. Therefore, the packet call 41 from the fixed network 40 is broadcasted as packet data signals 42 and 43 by the down-link of the UPCH in each of base station areas A and B although the packet data signal 43 is not used in the base station area B.

As described above, the conventional mobile packet communication system broadcasts each packet data signal of the packet communication in all base station areas in the same location area although the packet data signal is required by the mobile station existing in one base station area. This causes problems, in that:

(1) the transmission line and other relating equipment between the mobile switching center and each base station should be provided on the basis of unnecessary signalling capacity in addition to ordinary signalling capacity; and (2) the data through-put of the UPCH is degraded when packet communications are performed in several different base station areas in the same location area because the down-link of the UPCH should carry all packet data signals to each base station area.

SUMMARY OF THE INVENTION

The present invention solves the above problems, by providing a mobile packet communication system and a method of mobile packet communication, which are capable of transmitting a packet data only to a specific base station area in which a mobile station for the packet communication exists without transmitting the packet data to all base station areas in a same location area.

To do this, the mobile packet communication system according to this invention comprises a plurality of base stations for communicating with a plurality of mobile stations by dedicated radio channels for packet communication in a corresponding plurality of base station areas, a plurality of packet communication means for performing packet communication with the mobile stations, a location register for registering location information of a location area of each of the mobile stations and a mobile switching center interconnecting the base stations and the packet communication means.

Each base station comprises base station area identifier adding means for adding a base station area identifier which indicates a base station area corresponding to the base station having received a response packet from the mobile station.

The location information is notified and updated in the location register whenever the mobile station has changed the location area, The mobile switching center is connected to the location register, the mobile switching center comprises first receiving means for receiving a first packet data from the packet communication means and for extracting a mobile station identification number supplied with the packet data, location information storage means for retrieving a location information corresponding to the mobile station identification number from the location register and for storing the location information retrieved from the location register in correspondence with the mobile station identification number, second receiving means for receiving a second packet data from the base station and for extracting a base station area identifier and a mobile station identification number supplied with the packet data, base station area identifier storage means for storing the base station area identifier in correspondence with the mobile station identification number and for indicating validity of the base station area identifier, and transferring means for transferring the first packet data to all base stations in the same location area indicated by the location information when the base station area identifier stored in the base station area identifier storage means is invalid and for transferring the first packet data to a particular base station in accordance with the base station area identifier when the base station area identifier is valid.

The mobile switching center further comprises timer means for counting down the time after the transferring means has transferred the first packet data to a particular base station in accordance with the base station area identifier, judging means for judging whether a response packet for the first packet data has been received within the counting down time of the timer means, and set means for setting the validity of the base station area identifier stored in the base station area identifier storage means to invalid.

The method of mobile packet communication according to the present invention comprises the steps of receiving a first packet data from the packet communication means and extracting a mobile station identification number supplied with the signal, retrieving a location information corresponding to the mobile station identification number from the location register and storing the location information retrieved from the location register in correspondence with the mobile station identification number, receiving a second packet data from the base station and extracting a base station area identifier and a mobile station identification number supplied with the packet data, storing the base station area identifier in correspondence with the mobile station identification number and indicating validity of the base station area identifier, transferring the first packet data to all base stations in the same location area indicated by the location information when the base station area identifier stored is invalid, and transferring the first packet data to a particular base station in accordance with the base station area identifier when the base station area identifier is valid.

The method of mobile packet communication further comprises the steps of counting down the time after transferring the first packet data to a particular base station in accordance with the base station area identifier, judging whether a response packet for the first packet data being received within the count down, and setting the validity of the base station area identifier to invalid.

A more complete understanding of the present invention and many of its attendant advantages will be more readily attained from the following detailed description when considered in connection with the accompanying figures.

DETAILED DESCRIPTION OF PREFERRED EMBODIMENTS

Figure 1:
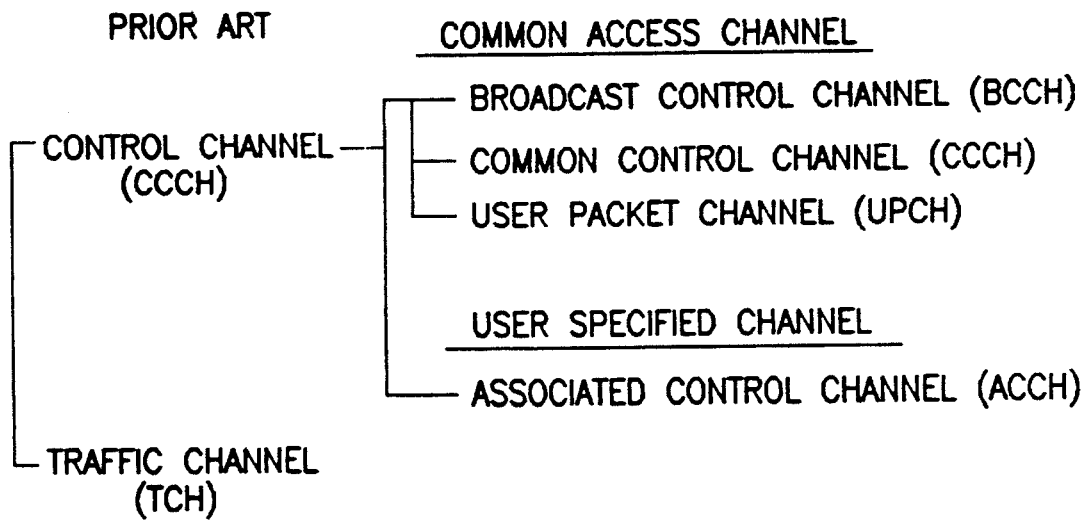
FIG. 1 is a configuration chart showing radio channels used in the mobile communication system.
Figure 2:
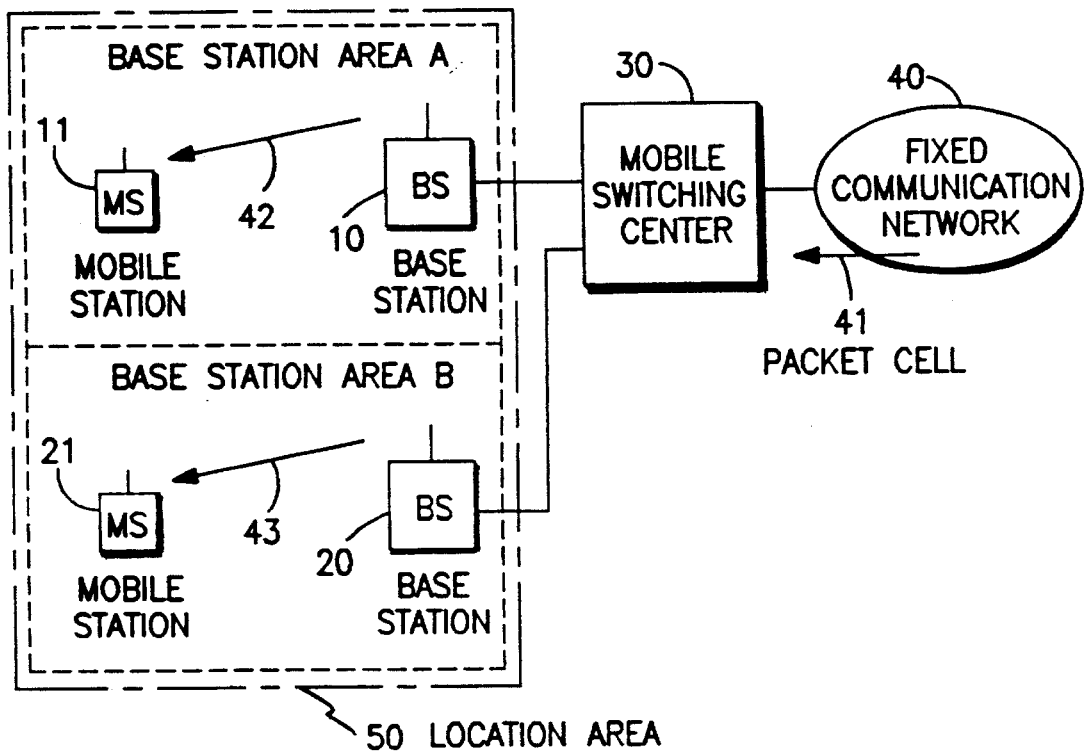
FIG. 2 is a schematic block diagram illustrating the conventional mobile packet communication system.
Figure 3:
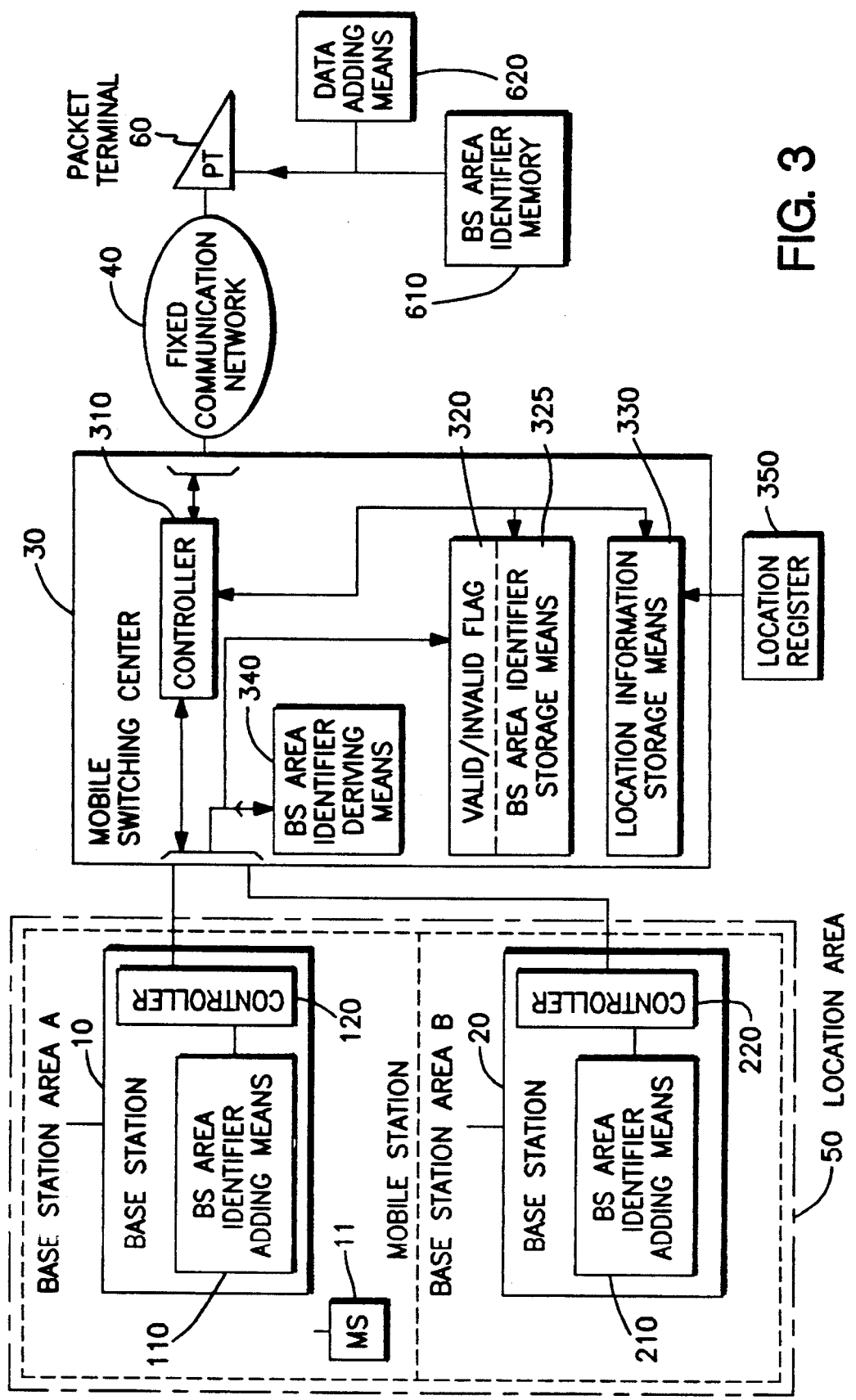
FIG. 3 is a schematic block diagram illustrating the mobile packet communication system according to the present invention.

A mobile packet communication system according to the present invention is illustrated in FIG. 3.

In FIG. 3, there is a location area 50 which consists of a base station area A and a base station area B (as this is only an example, any number of base station areas will be applicable). The base station area A is covered by radio signal of a base station 10 and the base station area B is covered by radio signal of a base station 20. Each base station 10, 20 is connected to a mobile switching center 30 by a transmission line, and the mobile switching center 30 is connected to a packet terminal 60 through a fixed communication network 40. A packet communication is performed between the packet terminal 60 and a mobile station 11 located in the base station area A.

The base station 10, 20 includes BS (base station) area identifier adding means 110, 210 which adds the BS area identifier to a packet information to be transferred to the mobile switching center 30 from the mobile station 11. The BS area identifier consists of information to identify a base station area from which the packet information is being transferred. A controller 120, 220 in each base station 10, 20 controls entire operation of base station relating to the present invention.

The mobile switching center 30 includes location information storage means which stores location information of the mobile station 11 retrieved from a location register 350. The mobile station 11 notifies the location area to be registered in the location register 350 whenever it changes the location area in which the mobile station 11 currently exists. The mobile switching center 30 also includes memory areas which consists of a valid or invalid flag 320 and BS area identifier storage means 325, and controller 310.

The valid or invalid flag 320 indicates whether the BS area identifier stored in the BS area identifier storage means 325 is effective or not.

BS area identifier deriving means is an alternative provision and it may be provided in the mobile switching center 30 instead of the BS area identifier adding means 100 or 200 provided in the base station 10 or 20. The BS area identifier deriving means identifies and derives the BS area identifier by location (port or terminal location) information of transmission lines interconnecting between the mobile switching center 30 and each base station 10 or 20. That is, one of the BS area identifier adding means in the base station or the BS area identifier deriving means in the mobile switching center, is required.

The BS area identifier added to the packet information from the base station 10 or derived by the BS area deriving means is extracted and stored in the BS area identifier storage means 325.

The controller 310 performs entire operation relating to the present invention.

Figure 4A:
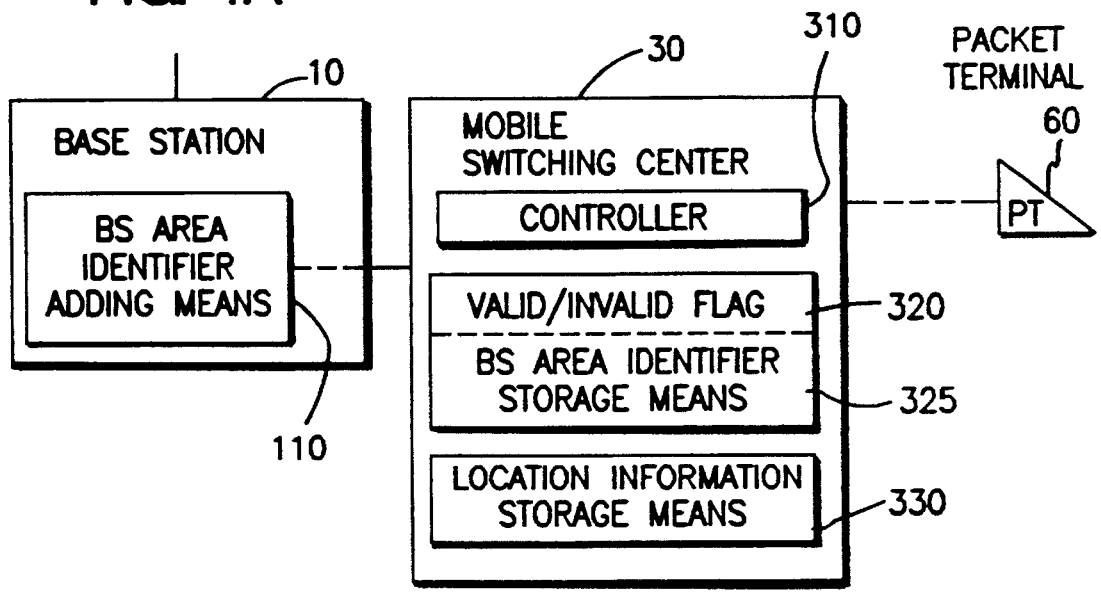
FIG. 4(a) is a schematic block diagram illustrating one embodiment of the mobile packet communication system according to the present invention.
Figure 4B:
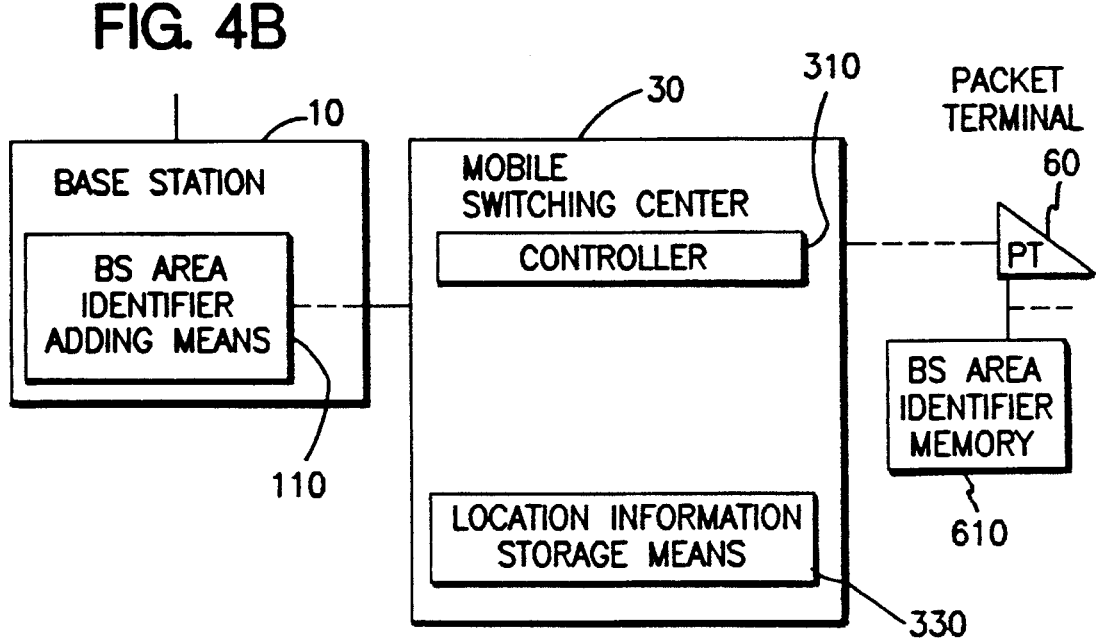
FIG. 4(b) is a schematic block diagram illustrating another embodiment of the mobile packet communication system according to the present invention.

A BS area identifier memory 610 and a data adding means 620 in the packet terminal 60 are an alternative for the valid or invalid flag 320 and the BS area identifier storage means 325 in the mobile switching center 30. If the valid or invalid flag 320 and the BS area identifier storage means 325 are provided in the mobile switching center 30, the BS area identifier memory 610 and the data adding means 620 are not required in the packet terminal 60 as shown in FIG. 4(a). Alternatively, the BS area identifier memory 610 and the data adding means 620 may be provided in the packet terminal 60 instead of the valid or invalid flag 320 and the BS area identifier storage means 325 in the mobile switching center 30 as shown in FIG. 4(b).

The packet terminal 60 is not only limited to a terminal, but also may be embodied by other means such as database with data communication facilities which are able to communicate with the mobile station are applicable.

There are two types of packet communication from the viewpoint of a logical link establishment. They are connection type communications and connectionless type communications. The connection type communication establishes the logical link for the communication and keeps the logical link during the communication. Therefore, when the mobile station moves to the other base station area, the logical link is kept by the handover operation which changes radio signal for the communication from one base station to the other base station. On the other hand, the connectionless type communication does not establish the logical link, and each packet data is individually treated for transmission and reception.

In the case of the connection type communication, it may preferable to introduce a BS area identifier update request signal for a mobile station to ensure the BS area identifier will be updated when the mobile station moves to the other base station area. In this case, each base station broadcasts each base station area code signal to identify each base station area, and when the mobile station has recognized change of base station area code, it requests to update the BS area identifier by the BS area identifier update request signal. The base station which has received this BS area identifier update request signal from the mobile station informs this request to the mobile switching center with the BS area identifier and corresponding mobile station identification number, and then, the BS area identifier for the mobile station is updated in the mobile switching center, or transferred to the packet terminal and updated in the packet terminal in case of the BS area identifier memory being provided in the packet terminal instead of the BS area identifier storage means in the mobile switching center.

Figure 5:
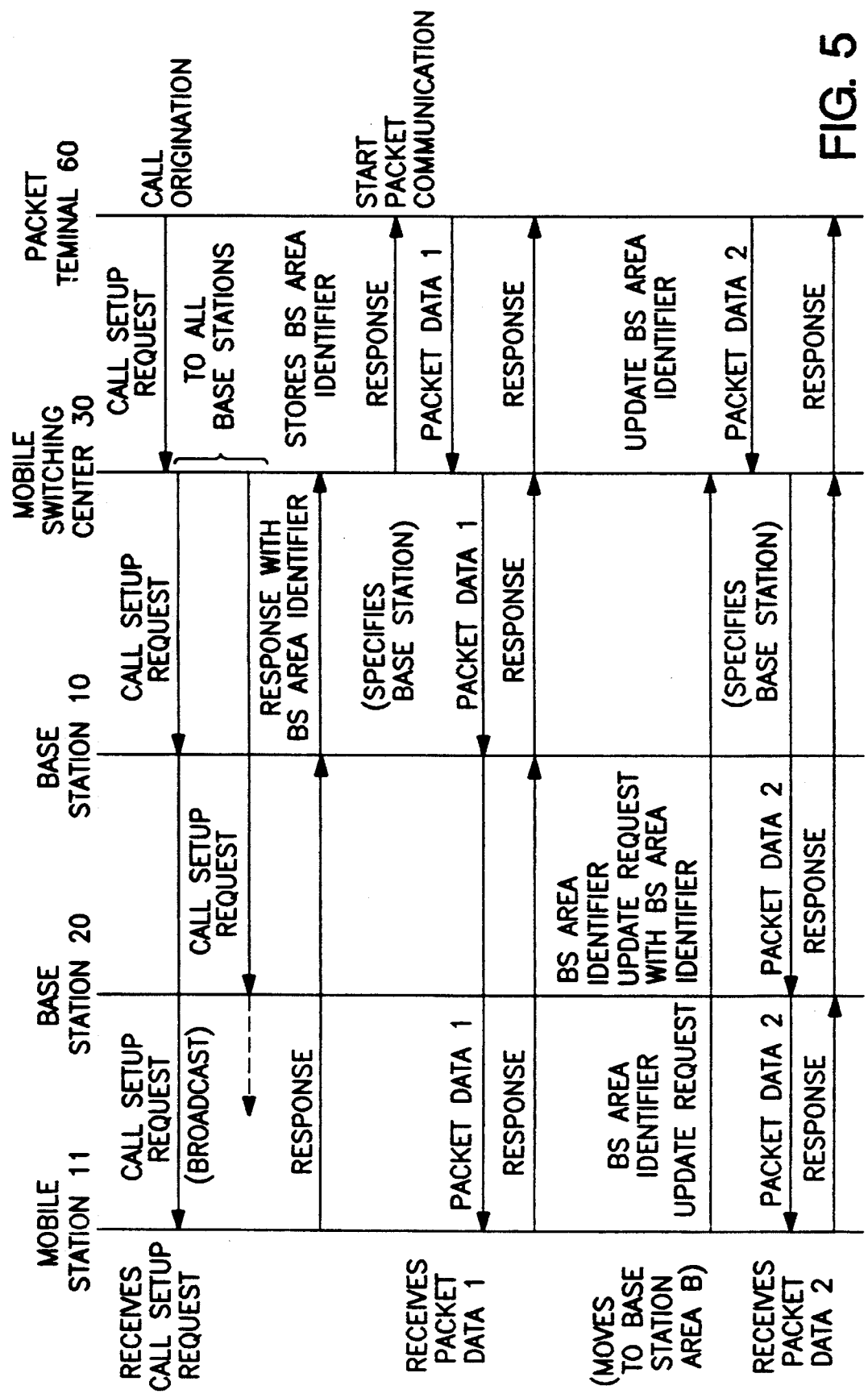
FIG. 5 is a sequence diagram showing procedures of the packet communication in the case wherein the connection type communication and the BS area identifier is stored in the mobile switching center.

FIG. 5 is a sequence chart of a packet communication from the packet terminal 60 to the mobile station 11 by the connection type communication, and the BS area identifier storage means are provided in the mobile switching center 30 as shown in FIG. 4(a).

The packet terminal 60 sends call setup request information to start a packet communication with the mobile station 11 located in the base station area A. The mobile switching center 30 having received the call setup request information identifies the destination mobile station identification number from the received information, and retrieves location information corresponding to the mobile station 11 from the location register. At this time, as the mobile switching center 30 can identify only the location information of the location area 50, the mobile switching center 30 instructs all base stations 10 and 20 in the location area 50 to send the call setup request information.

The mobile station 11 in the base station area A receives the call setup request information sent from the base station 10, and recognizes the call request to own mobile station. Then, the mobile station 11 sends back response information to the base station 10. The base station 10 adds the own BS area identifier to the response information and transfers to the mobile switching center 30.

The mobile switching center 30 extracts the BS area identifier attached to the response information and stores it into the BS area identifier storage means keeping correspondence between the BS area identifier and the mobile station identification number, and also the valid or invalid flag corresponding to the mobile station identification number and the BS area identifier is set to "valid". The response information is, then, transferred to the packet terminal 60, and the packet communication between the packet terminal 60 and the mobile station 11 is commenced.

A packet data 1 sent from the packet terminal 60 is received by the mobile switching center 30, and the mobile switching center 30 identifies the destination mobile station identification number and retrieves the valid or invalid flag corresponding to the mobile station identification number. If the flag is set to "valid", the mobile switching center 30 further retrieves the corresponding BS area identifier stored in the BS area identifier storage means 325.

The mobile switching center 30 has now recognized the base station area in which the destination mobile station exists, and then, the mobile switching center 30 specifies only the base station 10 for instructing the packet data sending (the base station 20 is not instructed). The packet data 1 sent from the base station 10 is received by the mobile station 11 and the response information is sent back to the packet terminal 60.

Meanwhile, when the mobile station 11 has entered in the base station area B from the base station area A, the mobile station 11 recognizes the change by receiving different base station area code signal and sends the BS area identifier update request signal to the base station 20. The base station 20 adds its own BS area identifier to the BS area identifier update request signal and transfers it to the mobile switching center 30. The mobile switching center 30 updates the BS area identifier in accordance with the information contained in the BS area update request signal.

Therefore, the packet data 2 sent from the packet terminal 60 in the next sequence is received by the mobile switching center 30 and specified to be sent through only the base station 20 in accordance with updated BS area identifier. The packet data 2 sent from the base station 20 is received by the mobile station now existing in the base station area B.

Figure 6:
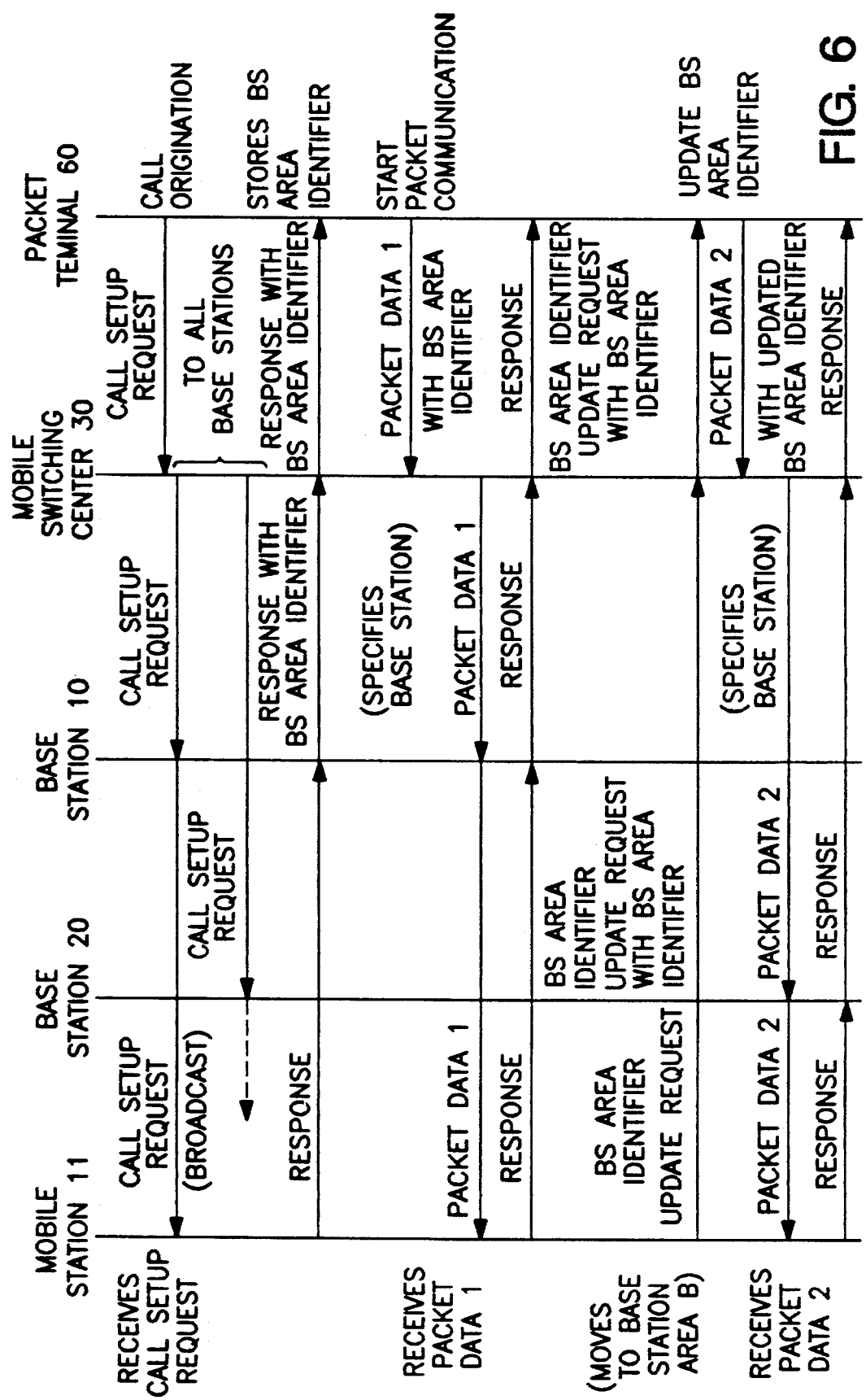
FIG. 6 is a sequence diagram showing procedures of the packet communication in the case wherein the connection type communication and the BS area identifier is stored in the packet terminal.

FIG. 6 is a sequence chart of another embodiment of packet communication from the packet terminal 60 to the mobile station 11 by the connection type communication, and the BS area identifier memory is provided in the packet terminal 60 as shown in FIG. 4(b).

In this case, sequences from sending call setup request information by the packet terminal 60 to sending back the response information by the mobile station 11 are same as those sequences in FIG. 5. That is, the call setup request information is sent from both of base stations 10 and 20.

The base station 10, which has received the response information sent from the mobile station 11, adds its own BS area identifier to the response information and transfers it to the mobile switching center 30. As the mobile switching center 30 is not provided with facilities for the BS area identifier, the response information with the BS area identifier is transferred to the packet terminal 60.

The packet terminal 60 stores the BS area identifier into the BS area identifier memory 610, and the packet communication between the packet terminal 60 and the mobile station 11 is commenced.

The packet terminal 60 sends a packet data 1 with the BS area identifier, which is added to the packet data by the data adding means 620, and the packet data 1 is received by the mobile switching center 30. The mobile switching center 30 identifies the destination base station area by the BS area identifier attached to the packet data 1, and specifies only the base station 10 for instructing the packet data sending (the base station 20 is not instructed). The packet data 1 sent from the base station 10 is received by the mobile station 11 and the response information is sent back to the packet terminal 60.

When the mobile station 11 has entered in the base station area B from the base station area A, the mobile station 11 recognizes the change by receiving a different base station area code signal and sends the BS area identifier update request signal to the base station 20. The base station 20 adds its own BS area identifier to the BS area identifier update request signal and transfers it to the mobile switching center 30. The mobile switching center 30 repeats the BS area identifier update request signal to the packet terminal 60. The BS area identifier stored in the BS area identifier memory 610 of the packet terminal 60 is updated in accordance with the information contained in the BS area update request signal.

Therefore, the packet data 2 sent from the packet terminal 60 in the next sequence contains updated BS area identifier and is received by the mobile switching center 30. The mobile switching center 30 specifies only the base station 20 for instructing the packet data sending in accordance with updated BS area identifier sent from the packet terminal 60. The packet data sent 2 from the base station 20 is received by the mobile station now existing in the base station area B.

In FIGS. 5 and 6, when the packet communication is released by either side of the mobile station 11 or the packet terminal 60, the mobile switching center 30 restores its conditions, and the mobile station requests location information registration to update its location information of the location area currently being existed.

Next, sequences for connectionless type communication will be described with reference to FIG. 7.

Figure 7:
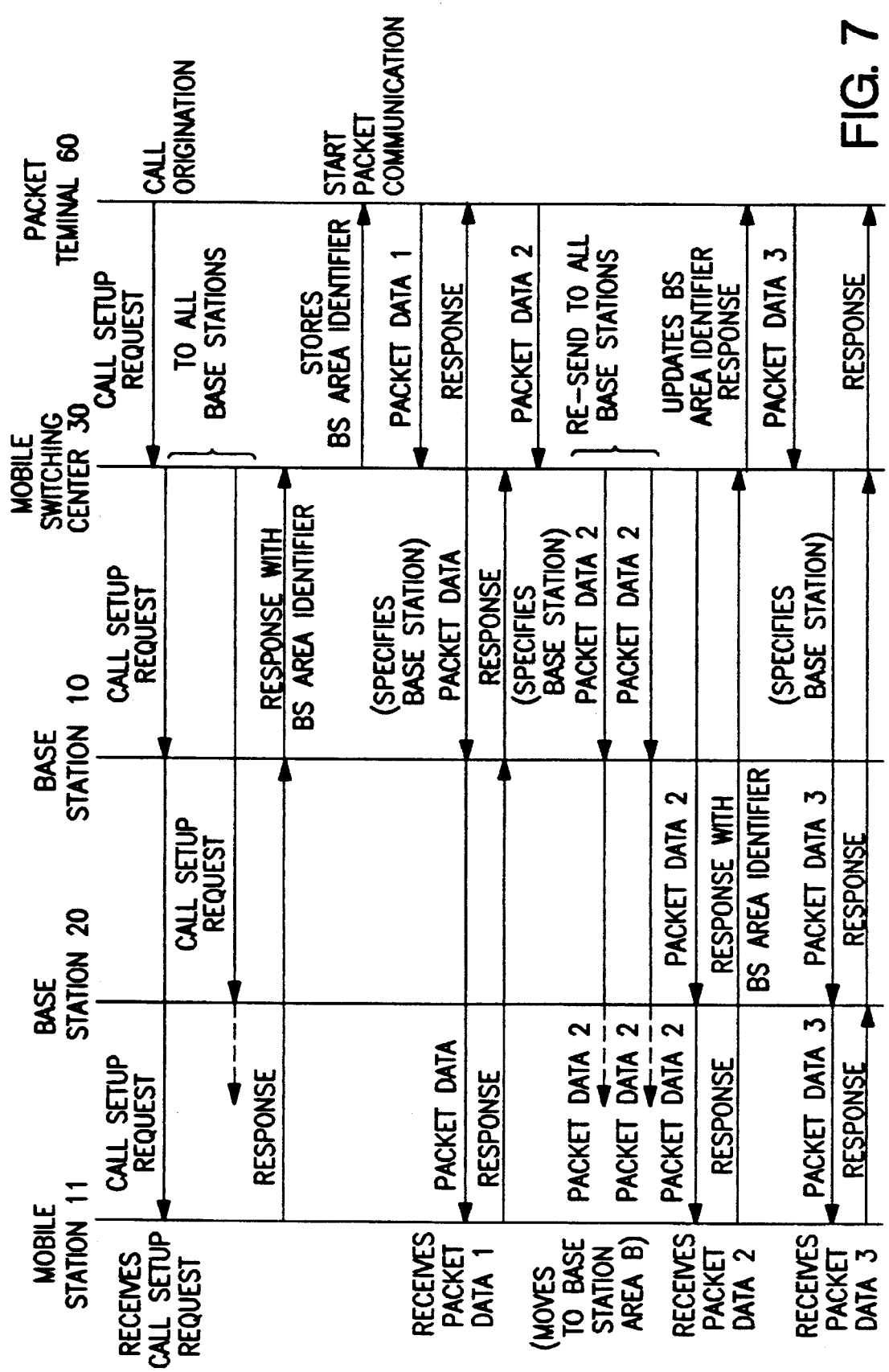
FIG. 7 is a sequence diagram showing procedures of the packet communication in the case of the connectionless type communication.

FIG. 7 is a sequence chart of the packet communication from the packet terminal 60 to the mobile station 11 by the connectionless type communication, and the BS area identifier storage means are provided in the mobile switching center 30 as shown in FIG. 4(a).

In this case, sequences from sending call setup request information by the packet terminal 60 to sending back the response information by the mobile station 11 are same as those sequences in FIG. 5. That is, the call setup request information is sent from both of base stations 10 and 20.

The base station 10, which has received the response information sent from the mobile station 11, adds its own BS area identifier to the response information and transfers it to the mobile switching center 30.

The mobile switching center 30 extracts the BS area identifier attached to the response information and stores it into the BS area identifier storage means keeping correspondence between the BS area identifier and the mobile station identification number, and also the valid or invalid flag corresponding to the mobile station identification number and the BS area identifier is set to "valid". The response information is, then, transferred to the packet terminal 60, and the packet communication between the packet terminal 60 and the mobile station 11 is commenced.

A packet data 1 sent from the packet terminal 60 is received by the mobile switching center 30, and the mobile switching center 30 identifies the destination mobile station identification number and retrieves the valid or invalid flag corresponding to the mobile station identification number. If the flag is set to "valid", the mobile switching center 30 further retrieves corresponding BS area identifier stored in the BS area identifier storage means 325.

The mobile switching center 30 has now recognized the base station area in which the destination mobile station exists, and then, the mobile switching center 30 specifies only the base station 10 for instructing the packet data sending (the base station 20 is not instructed). The packet data 1 sent from the base station 10 is received by the mobile station 11 and the response information is sent back to the packet terminal 60.

Even if the mobile station 11 has moved to the base station area B from the base station area A, this change is not notified to the mobile switching center 30. Therefore, the mobile switching center 30 still specifies the base station 10 for instructing the packet data (packet data 2) sending.

As the mobile station 11 no longer exists in the base station area A, the response information is not sent back to the mobile switching center 30. In the case of the connectionless type communication, the mobile switching center 30 operates a count down counter every time after sending a packet data to a base station, and it recognizes that the mobile station has moved to other base station area if the response information is not received before the count down timer has expired.

When the mobile switching center 30 has recognized that the mobile station 11 had moved to other base station area, the mobile switching center 30 sets the valid or invalid flag corresponding to the mobile station 11 to "invalid", and then, instructs to send same packet data (packet data 2) to all base stations 10 and 20 in the location area 50.

This time, the mobile station 11 can receive the packet data 2 from the base station 20, and sends back the response information through the base station 20. As the base station 20 adds own BS area identifier to the response information, the mobile switching center 30 can update the BS area identifier corresponding to the mobile station 11 and set the flag to "valid" again.

The packet data 3 sent from the packet terminal 60 in the next sequence is only transferred to the base station 20 in accordance with the updated BS area identifier, and received by the mobile station 11 which sends back the response information in turn.

Figure 8:
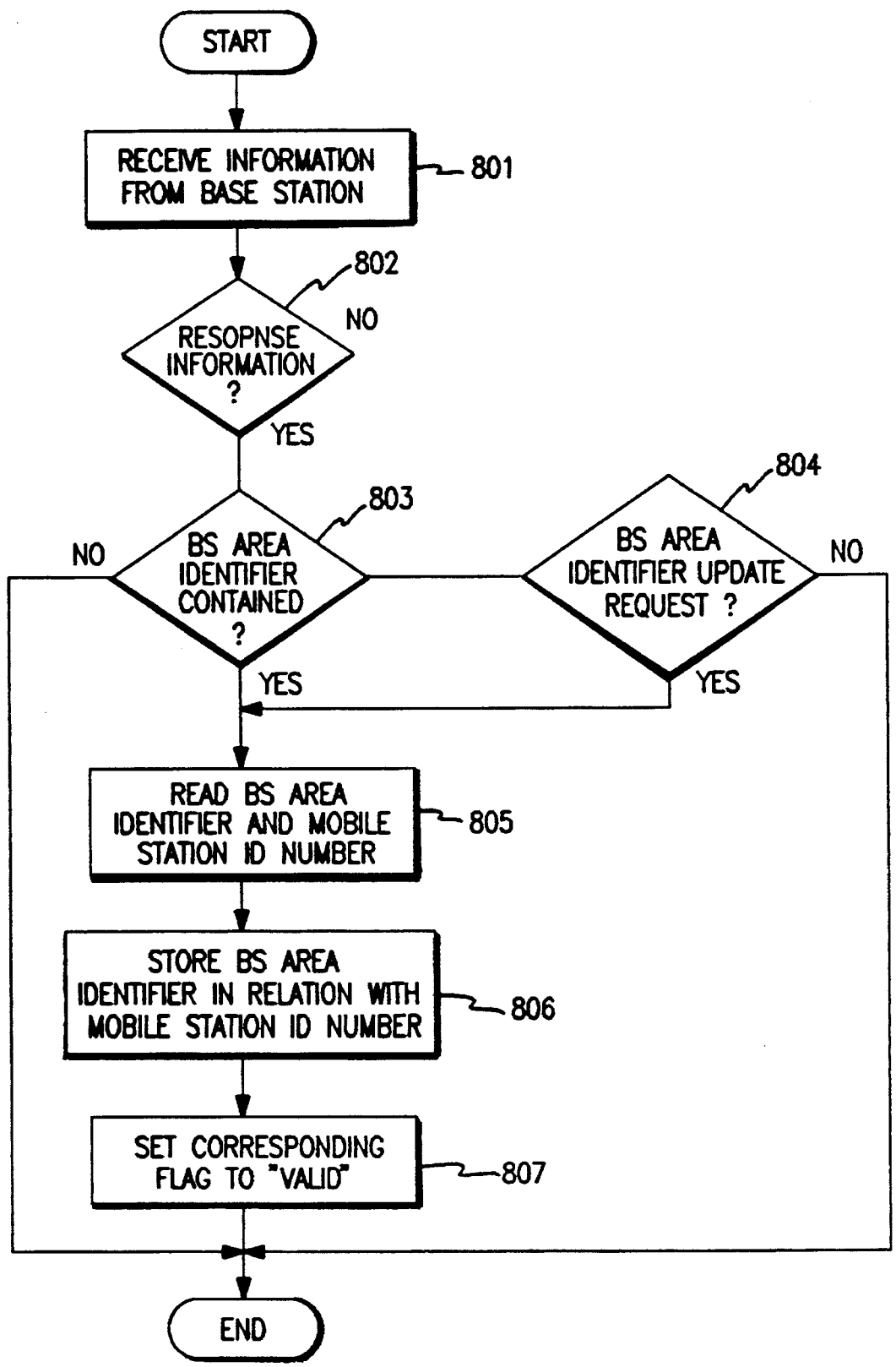
FIG. 8 is a flow chart illustrating the operation for storing the BS area identifier.
Figure 9A:
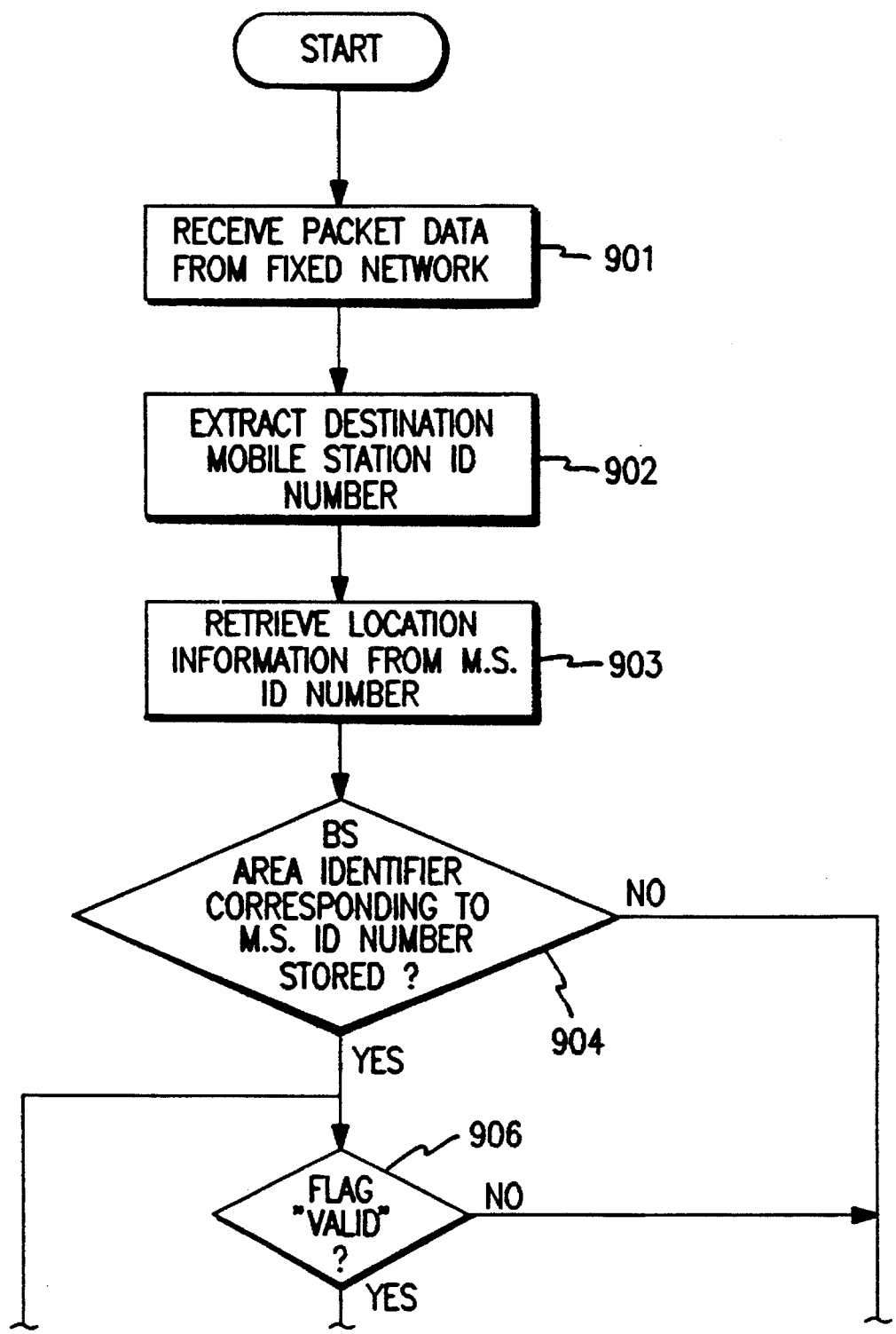
FIG. 9 is a flow chart illustrating the operation of mobile switching center for transmitting packet data to all base stations or to a specific base station.
Figure 9B:
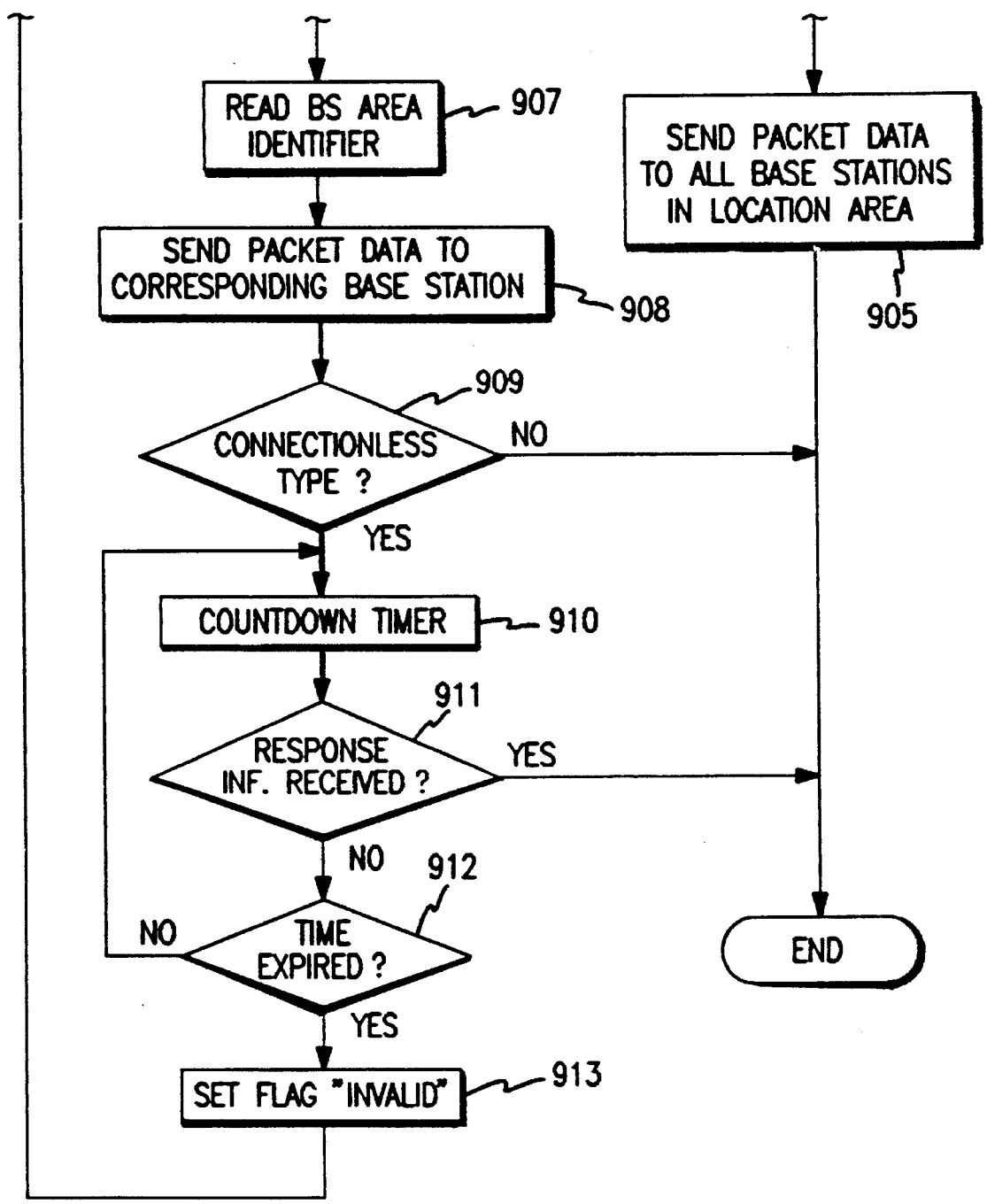

FIGS. 8 and 9 are flow charts showing the summary of operations described above.

FIG. 8 is a flow chart showing the operation how the BS area identifier is stored.

The mobile switching center receives information from the base station (step 801) and discriminates the type of information. If the information is the response information (step 802: YES), it is further confirmed whether the BS area identifier is contained or not (step 803). The type of information is also confirmed whether it is the BS area identifier update request or not (step 804).

When the information is related to the BS area identifier, the BS area identifier and the mobile station identification number are read out (step 805). The read out BS area identifier is stored in the BS area identifier storage means in relation to the mobile station identification number (step 806), and corresponding valid or invalid flag is set to "valid" (step 807)

FIG. 9 is a flow chart showing how the packet data is transferred to all base stations or only to a specific base station.

The mobile switching center receives a packet data from the packet terminal in the fixed communication network (step 901). An identification number of the destination mobile station is extracted from the packet data (step 902), and the location information corresponding to the mobile station identification number is retrieved from the location register (step 903).

It is confirmed whether the BS area identifier for the mobile station has been stored or not (step 904).

If the case that the BS area identifier has not been stored (step 904: NO) or the valid or invalid flag is set to "invalid" (step 906: NO) even if the BS area identifier has been stored, the packet data should be transferred to all base stations in the location area indicated by the retrieved location information (step 905).

When the BS area identifier has been stored (step 904: YES) and the valid or invalid flag is set to "valid" (step 906: YES), the BS area identifier is read out (step 907) and the packet data is transferred to the base station corresponding to the BS area identifier (step 908).

If the connection type communication (step 909: NO), the operation is completed here. However, in the case of the connectionless type communication (step 909: YES), it should wait until the response information comes back from the mobile station. For this purpose, a count down timer is activated (step 910), to wait for the response information. When the response information is sent back from the mobile station before the count down timer has expired (step 911: YES), the operation is completed. But, if the response information is not received within the timing of the count down timer (step 912: YES), it is recognized as that the mobile station has moved to other base station area, and the valid or invalid flag is set to "invalid" (step 913).

Therefore, the mobile switching center again attempts to send the packet information, and at this time, the packet data is transferred to all base stations in the location area (step 905) because the base station area in which the mobile station exists is unknown.

In the explanation above referring to FIGS. 5 to 9, it is assumed that the BS area identifier adding means are provided in the base station. However, it is also applicable to provide the BS area identifier deriving means in the mobile switching center instead of the BS area identifier adding means as described before.

Also, when the mobile switching center transfers the packet data either to all base stations in the location area or to only a specific base station indicated in the BS area identifier, the mobile switching center may transfer additional information which notifies the base station that the packet data is being transferred to all base stations or to only a specific base station. The base station which has received the additional information can perform different operations depending on the case, e.g. changing transmitting cycle of packet data signal from the base station.

As described above, the present invention is capable of specifying a base station from which the packet data is to be transmitted. Therefore, unnecessary data is not transferred to unnecessary base station areas, and the efficiency of transmission between base stations and the mobile switching center is improved, and also, data through-put of the UPCH is improved.

Although the present invention has been fully described by way of the preferred embodiment thereof with reference to the accompanying drawings, numerous changes and modifications will be apparent to those having skill in this field. Therefore, unless these changes and modifications otherwise depart from the scope of the present invention, they should be construed as included therein.

We claim:

1. A mobile packet communication system comprising:

a plurality of base stations in a corresponding plurality of base station areas, said base stations communicating with a plurality of mobile stations by dedicated radio channels for packet communication, said base stations comprising base station area identifier adding means for adding a base station area identifier indicating a base station area corresponding to each of said base stations to a response packet from said mobile stations;

a plurality of packet communication means for performing packet communication with said mobile stations;

a location register for registering location information of a location area of each of said mobile stations whenever said mobile stations change location area; and a mobile switching center interconnecting said base stations and said packet communication means, being connected to said location register, comprising first receiving means for receiving a first packet data from said packet communication means and for extracting a mobile station identification number supplied therewith;

location information storage means for retrieving a location information corresponding to said mobile station identification number from said location register and for storing said location information retrieved therefrom in correspondence with said mobile station identification number;

second receiving means for receiving a second packet data from said base station and for extracting a base station area identifier and a mobile station identification number supplied therewith;

base station area identifier storage means for storing said base station area identifier in correspondence with said mobile station identification number and for indicating validity of said base station area identifier; and transferring means for transferring said first packet data to all of said base stations in said same location area indicated by said location information stored in said location information storage means when said base station area identifier stored in said base station area identifier storage means is invalid and for transferring said first packet data to a particular base station in accordance with said base station area identifier stored in said base station area identifier storage means when said base station area identifier is valid.

2. The mobile packet communication system according to claim 1, wherein said mobile switching center further comprises:

timer means for counting down time after said transfers means transferring said first packet data to a particular base station in accordance with said base station area identifier;

judging means for judging whether a response packet for said first packet data being received within a counting down time of said timer means; and set means for setting said validity of said base station area identifier stored in said base station area identifier storage means to invalid.

3. A mobile packet communication system comprising:

a plurality of base stations in a corresponding plurality of base station areas, said base stations communicating with a plurality of mobile stations by dedicated radio channels for packet communication, said base stations comprising base station area identifier adding means for adding a base station area identifier indicating a base station area corresponding to each of said base stations to a response packet from said mobile stations;

a plurality of packet communication means for performing packet communication with said mobile stations, comprising base station area identifier memory means for storing said base station area identifier being added to said response packet from a communicating mobile station; and data adding means for adding said base station area identifier to a sending packet when said base station area identifier is stored in said base station area identifier memory;

a location register for registering location information of a location area of each of said mobile stations being notified whenever said mobile stations change location area; and a mobile switching center interconnecting said base stations and said packet communication means, being connected to said location register, comprising receiving means for receiving a packet data from said packet communication means and for extracting a mobile station identification number and said base station area identifier supplied therewith;

location information storage means for retrieving a location information corresponding to said mobile station identification number from said location register and for storing said location information retrieved therefrom in correspondence with said mobile station identification number; and transferring means for transferring said packet data from said packet communication means to said all base stations in said same location area indicated by said location information stored in said location information storage means when said packet data does not include said base station area identifier and for transferring said packet data from said packet communication means to a particular base station in accordance with said base station area identifier when said base station area identifier is included in said packet data.

4. A mobile packet communication system comprising:

a plurality of base stations in a corresponding plurality of base station areas, said base stations communicating with a plurality of mobile stations by dedicated radio channels for packet communication and said base stations;

a plurality of packet communication means for performing packet communication with said mobile stations;

a location register for registering location information of a location area of each of said mobile stations being notified whenever said mobile stations change location area; and a mobile switching center interconnecting said base stations and said packet communication means, being connected to said location register, comprising receiving means for receiving a packet data from said packet communication means and for extracting a mobile station identification number supplied therewith;

location information storage means for retrieving a location information corresponding to said mobile station identification number from said location register and for storing said location information retrieved therefrom in correspondence with said mobile station identification number;

base station area identifier deriving means for deriving base station area identifier indicating a base station area from which a response packet data being sent back in accordance with port number information of transmission line connected to said base station and for extracting a mobile station identification number supplied with said response packet data;

base station area identifier storage means for storing said base station area identifier in correspondence with said mobile station identification number and for indicating validity of said base station area identifier; and transferring means for transferring said first packet data to said all base stations in said same location area indicated by said location information stored in said location information storage means when said base station area identifier stored in said base station area identifier storage means is invalid and for transferring said first packet data to a particular base station in accordance with said base station area identifier stored in said base station area identifier storage means when said base station area identifier is valid.

5. A mobile packet communication system comprising:

a plurality of base stations in a corresponding plurality of base station areas, said base stations communicating with a plurality of mobile stations by dedicated radio channels for packet communication and said base stations comprising:

base station area identifier adding means for adding a base station area identifier indicating a base station area corresponding to each of said base stations to a response packet from said mobile stations; and base station area code broadcasting means for broadcasting a different base station area code signal for each base station;

said mobile stations comprising change of base station area notifying means for recognizing a change of existing base station area by receiving said different base station area code signal and for transmitting a notification signal of change of base station area;

a plurality of packet communication means for performing packet communication with said mobile stations;

a location register for registering location information of a location area of each of said mobile stations being notified whenever said mobile stations change location area; and a mobile switching center interconnecting said base stations and said packet communication means, being connected to said location register, comprising first receiving means for receiving a first packet data from said packet communication means and for extracting a mobile station identification number supplied therewith;

location information storage means for retrieving a location information corresponding to said mobile station identification number from said location register and for storing said location information retrieved therefrom in correspondence with said mobile station identification number;

second receiving means for receiving a second packet data from said base station and for extracting a base station area identifier and a mobile station identification number supplied therewith;

base station area identifier storage means for storing said base station area identifier in correspondence with said mobile station identification number and for indicating validity of said base station area identifier;

base station area identifier update means for updating said base station area identifier stored in said base station area identifier storage means upon receipt of said notification signal of change of base station area from said mobile station through said base station; and transferring means for transferring said first packet data to said all base stations in said same location area indicated by said location information stored in said location information storage means when said base station area identifier stored in said base station area identifier storage means is invalid and for transferring said first packet data to a particular base station in accordance with said base station area identifier stored in said base station area identifier storage means when said base station area identifier is valid.

6. A method of mobile packet communication in a mobile packet communication system including a plurality of base stations in a corresponding plurality of base station areas, said base stations communicating with a plurality of mobile stations by dedicated radio channels for packet communication, said base stations comprising base station area identifier adding means for adding a base station area identifier indicating a base station area corresponding to each of said base stations to a response packet from said mobile stations, a plurality of packet communication means for performing packet communication with said mobile stations, a location register for registering location information of a location area of each of said mobile stations and a mobile switching center interconnecting said base stations and said packet communication means, being connected to said location register, said method comprising the steps of:

receiving a first packet data from said packet communication means and extracting a mobile station identification number supplied therewith;

retrieving a location information corresponding to said mobile station identification number from said location register and storing said location information retrieved therefrom in correspondence with said mobile station identification number;

receiving a second packet data from said base station and extracting a base station area identifier and a mobile station identification number supplied therewith;

storing said base station area identifier in correspondence with said mobile station identification number and indicating validity of said base station area identifier;

transferring said first packet data to said all base stations in said same location area indicated by said location information when said base station area identifier stored is invalid; and transferring said first packet data to a particular base station in accordance with said base station area identifier when said base station area identifier is valid.

7. The method of mobile packet communication according to claim 6, further comprising the steps of:

counting down time after transferring said first packet data to a particular base station in accordance with said base station area identifier;

judging whether a response packet for said first packet data is received within said counting down time; and setting said validity of said base station area identifier to invalid.

* * * * *